(12) United States Patent
Tanaka et al.

(10) Patent No.: US 9,332,212 B2
(45) Date of Patent: May 3, 2016

(54) IMAGING APPARATUS WITH IMPROVED PRE-PROCESSING

(71) Applicant: OLYMPUS CORPORATION, Tokyo (JP)

(72) Inventors: Yoshinobu Tanaka, Tokyo (JP); Akira Ueno, Tokyo (JP); Takashi Yanada, Tokyo (JP); Ayahiko Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/477,188

(22) Filed: Sep. 4, 2014

(65) Prior Publication Data

US 2015/0070530 A1 Mar. 12, 2015

(30) Foreign Application Priority Data

Sep. 9, 2013 (JP) ................................. 2013-186471

(51) Int. Cl.
  *H04N 5/228* (2006.01)
  *H04N 5/77* (2006.01)
  *H04N 5/232* (2006.01)
  *H04N 5/225* (2006.01)

(52) U.S. Cl.
  CPC ........... *H04N 5/772* (2013.01); *H04N 5/23229* (2013.01); *H04N 5/77* (2013.01)

(58) Field of Classification Search
  CPC ...... H04N 5/77; H04N 5/772; H04N 5/23229
  USPC ..................... 348/207, 222.1, 333.01, 333.12
  See application file for complete search history.

(56) References Cited

U.S. PATENT DOCUMENTS

| 5,073,959 | A * | 12/1991 | Sugiura | ................. | G06T 7/0083 |
|---|---|---|---|---|---|
| | | | | | 382/266 |
| 8,466,978 | B2 * | 6/2013 | Safai | ...................... | H04N 5/232 |
| | | | | | 348/222.1 |
| 8,849,090 | B2 * | 9/2014 | Kosakai | ................. | H04N 5/232 |
| | | | | | 386/219 |
| 2003/0210335 | A1 * | 11/2003 | Carau, Sr. | ............ | H04N 1/2112 |
| | | | | | 348/231.2 |
| 2003/0210830 | A1 * | 11/2003 | Goto | ....................... | H04N 19/86 |
| | | | | | 382/268 |
| 2014/0146194 | A1 * | 5/2014 | Ju | ........................ | G06F 1/3278 |
| | | | | | 348/222.1 |

FOREIGN PATENT DOCUMENTS

JP  4179701 B2  11/2008

* cited by examiner

*Primary Examiner* — Ngoc-Yen Vu
(74) *Attorney, Agent, or Firm* — Westerman, Hattori, Daniels & Adrian, LLP

(57) ABSTRACT

The imaging apparatus include a solid-state imaging device which has a plurality of pixels and outputs a pixel signal corresponding to a formed image of a subject as an image data; an image-capturing processing unit which outputs a pre-processed image data that is obtained by performing pre-processing on a part of the image data input from the solid-state imaging device, and an un-processed image data except the part of the image data from the image data input from the solid-state imaging device; and a storage unit which stores the pre-processed image data and the un-processed image data.

4 Claims, 9 Drawing Sheets

FIG. 6

IMAGING APPARATUS WITH IMPROVED PRE-PROCESSING

BACKGROUND OF THE INVENTION

1. Field of the Invention

The present invention relates to an imaging apparatus.

Priority is claimed on Japanese Patent Application No. 2013-186471, filed Sep. 9, 2013, the content of which is incorporated herein by reference.

2. Description of Related Art

In the imaging of an imaging apparatus, such as a digital camera, a process such as a spatial filtering process is performed on a signal of each pixel (hereinafter, referred to as a "pixel signal") output from a solid-state imaging device provided in the imaging apparatus. In general, the solid-state imaging device performs a raster scan of pixels, and sequentially outputs pixel signals in a horizontal direction of the image. When performing a spatial filtering process directly on the pixel signals that are output as described above, an image-processing device that is provided in the imaging apparatus and performs the spatial filtering process needs to include a line memory that temporarily stores pixel signals in a horizontal direction (lateral direction), which are output from the solid-state imaging device, by the number of rows required for the spatial filtering process (refer to FIGS. 9A and 9B).

For example, as shown in FIG. 9A, when performing the spatial filtering process on "3×3" pixels of an image, the image-processing device processes image data of "3 rows×3 columns" simultaneously. Therefore, as shown in FIG. 9B, the image-processing device needs to include two line memories in which pixel signals in the horizontal direction of the image are stored by one row. FIGS. 9A and 9B show an example of the configuration including two line memories (each for 6000 pixels) corresponding to an image having a horizontal width (image size in the horizontal direction) of 6000 pixels.

In the imaging apparatus in recent years, as the number of pixels of the solid-state imaging device has increased with an increase in the resolution of an image to be captured, the number of pixels in the horizontal direction of the solid-state imaging device has also increased every year. For this reason, in the image-processing device, the storage capacity of each line memory increases according to the corresponding number of pixels in the horizontal direction in the spatial filtering process. The increase in the storage capacity of each line memory in the image-processing device causes an increase in the circuit size of the imaging apparatus.

For example, in the configuration shown in FIG. 9B, a case of an image having a horizontal width of 10000 pixels is considered. In this case, it is possible to correspond to an image which has a horizontal image size of 10000 pixels by setting the storage capacity of each line memory to 10000 pixels. However, if the storage capacity of the line memory is set to 10000 pixels, the circuit size is increased by the increased amount.

Therefore, for example, Japanese Patent (Granted) Publication No. 4179701 discloses a technique of an image-processing device that performs image processing on one image a multiple of times. In the technique disclosed in Japanese Patent (Granted) Publication No. 4179701, pixel signals output from a solid-state imaging device are temporarily stored in a frame memory provided outside the image-processing device, and then image processing is performed multiple times while reading pixel signals required for processing from the frame memory, thereby generating one image. That is, in the technique disclosed in Japanese Patent (Granted) Publication No. 4179701, one image is divided into a plurality of blocks, and image processing is performed by the same number of times as the number of divided blocks, thereby generating one image.

SUMMARY OF THE INVENTION

Means for Solving the Problem

According to a first aspect of the present invention, an imaging apparatus is provided, including: a solid-state imaging device which has a plurality of pixels and outputs a pixel signal corresponding to a formed image of a subject as an image data; an image-capturing processing unit which outputs a pre-processed image data that is obtained by performing pre-processing on a part of the image data input from the solid-state imaging device, and an un-processed image data except the part of the image data from the image data input from the solid-state imaging device; and a storage unit which stores the pre-processed image data and the un-processed image data.

According to a second aspect of the present invention, in the first aspect, the image-capturing processing unit may include: a pre-processing section that has a line memory, which stores the image data whose amount is smaller than a data amount of the image data in a first direction of the image, and outputs the pre-processed image data obtained by performing pre-processing on the image data of the image divided within a range of the data amount of the image data that is capable of being stored in the line memory; a first data transmission section that transmits the pre-processed image data to the storage unit; and a second data transmission section that transmits the image data in the first direction of the image that has not been pre-processed by the pre-processing section, to the storage unit as the un-processed image data.

According to a third aspect of the present invention, in the second aspect, the image-capturing processing unit may further include: a data acquisition section that acquires image data stored in the storage unit; and a selection section that outputs the image data input from the solid-state imaging device or the image data acquired by the data acquisition section to at least one of the pre-processing section and the second data transmission section.

According to a fourth aspect of the present invention, in the third aspect, in a first operation, the first data transmission section may transmit first pre-processed image data, which is obtained after the pre-processing section performs pre-processing on the image data of a first image obtained by dividing the image within a range of the data amount of the image data that is capable of being stored in the line memory, to the storage unit, and the second data transmission section may transmit the image data of a second image obtained by dividing the image that has not been pre-processed by the pre-processing section, as first un-processing image data, to the storage unit. In addition, in a second operation after the first operation is completed, the data acquisition section may acquire the first un-processing image data stored in the storage unit, the selection section may output the first un-processing image data to the pre-processing section, and the first data transmission section may transmit second pre-processed image data, which is obtained after the pre-processing section performs pre-processing on the first un-processing image data, to the storage unit.

According to a fifth aspect of the present invention, in the fourth aspect, the image-capturing processing unit may further include a conversion section that performs conversion processing for converting the pre-processed image data and outputs converted image data after the conversion processing.

According to a sixth aspect of the present invention, in the third aspect, the conversion section may include a resizing section that resizes an image corresponding to the pre-processed image data to an image, which has a size set in advance in the first direction and a second direction perpendicular to the first direction, and outputs the converted image data of the resized image.

According to a seventh aspect of the present invention, in the sixth aspect, in the second operation, the first data transmission section may transmit second pre-processed image data, which is obtained after the pre-processing section performs pre-processing on the first un-processing image data, to the storage unit, and the second data transmission section may transmit first converted image data, which is obtained after the resizing section performs a resizing process on the second pre-processed image data, to the storage unit. In addition, in a third operation after the second operation is completed, the data acquisition section may acquire the first pre-processed image data stored in the storage unit, the selection section may output the first pre-processed image data to the resizing section, and the second data transmission section may transmit second converted image data, which is obtained after the resizing section performs a resizing process on the first pre-processed image data, to the storage unit.

BRIEF DESCRIPTION OF THE DRAWINGS

FIG. 6 is a diagram schematically showing an example of the first operation in a spatial filtering process by the imaging apparatus of the second embodiment.

DETAILED DESCRIPTION OF THE INVENTION

First Embodiment

Figure 1:
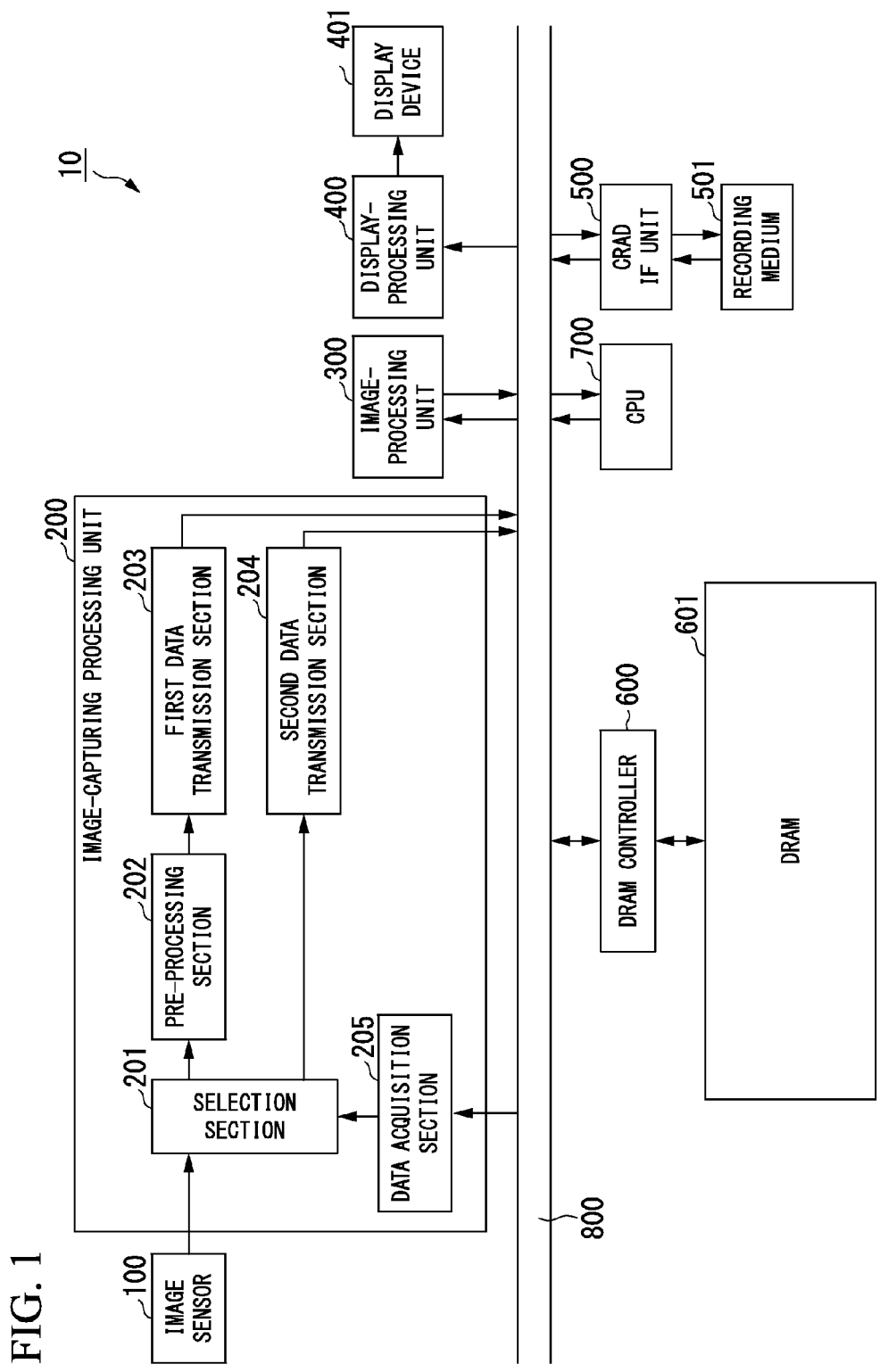
FIG. 1 is a block diagram showing the schematic configuration of an imaging apparatus according to a first embodiment of the present invention.

Hereinafter, embodiments of the present invention will be described with reference to the accompanying diagrams. FIG. 1 is a block diagram showing the schematic configuration of an imaging apparatus according to a first embodiment. An imaging apparatus 10 shown in FIG. 1 includes an image sensor 100, an image-capturing processing unit 200, an image-processing unit 300, a display-processing unit 400, a display device 401, a card interface (IF) unit 500, a recording medium 501, a dynamic random access memory (DRAM) controller 600, a DRAM 601, and a CPU 700. The image-capturing processing unit 200 of the imaging apparatus 10 includes a selection section 201, a pre-processing section 202, a first data transmission section 203, a second data transmission section 204, and a data acquisition section 205.

The image-capturing processing unit 200, the image-processing unit 300, the display-processing unit 400, the card IF unit 500, the DRAM controller 600, and the CPU 700 in the imaging apparatus 10 are connected to each other through a data bus 800. For example, reading of data from the DRAM 601 connected to the DRAM controller 600 and writing of data into the DRAM 601 are performed by direct memory access (DMA).

The image sensor 100 is a solid-state imaging device represented by a charge coupled device (CCD) image sensor or a complementary metal oxide semiconductor (CMOS) image sensor that photoelectrically converts an optical image of a subject that is formed by a lens (not shown). The image sensor 100 performs a raster scan of pixels provided in the image sensor 100 itself, and sequentially outputs pixel signals corresponding to subject light to the image-capturing processing unit 200, as image data, in a horizontal direction of the image.

The image-capturing processing unit 200 acquires the image data input from the image sensor 100, performs pre-processing including a spatial filtering process on the acquired image data, and transmits (writes) image data obtained as a result of the pre-processing to the DRAM 601 through the DRAM controller 600.

The amount of image data that can be pre-processed by the image-capturing processing unit 200, that is, the amount of data in a horizontal direction of the image is smaller than the amount of image data that the image sensor 100 outputs as the amount of data of one row. Therefore, the image-capturing processing unit 200 transmits (writes) image data, which cannot be pre-processed, to the DRAM 601 through the DRAM controller 600 as it is, that is, without performing pre-processing. Then, the image-capturing processing unit 200 completes pre-processing on data, which can be pre-processed, and stores the pre-processed data in the DRAM 601 as it is. Then, the image-capturing processing unit 200 acquires image data that has not been pre-processed, performs pre-processing on the acquired image data, and transmits (writes) the pre-processed data to the DRAM 601 again. That is, when image data having an amount in the horizontal direction that cannot be pre-processed is input, the image-capturing processing unit 200 performs pre-processing on all pieces of the input image data by performing the pre-processing separately on the input image data divided in a range of the amount of data that can be pre-processed.

The selection section 201 selects a component of the output destination of the input image data. Specifically, as an output destination of the image data input from the image sensor 100 and the image data input from the data acquisition section 205, the selection section 201 selects one or both of the pre-processing section 202 and the second data transmission section 204. Then, the selection section 201 outputs the input image data to the selected output destination.

Figure 9B:
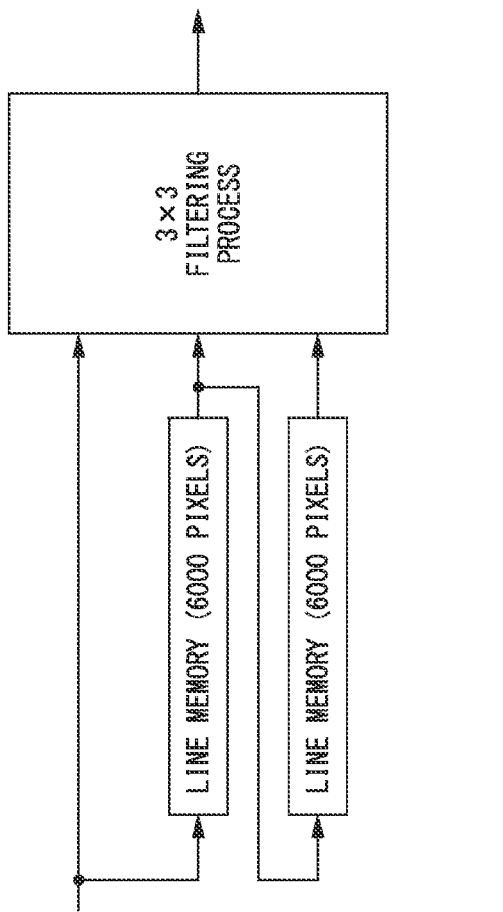
FIG. 9B is a diagram showing a spatial filtering process in a known imaging apparatus and the schematic configuration to execute the spatial filtering process.
Figure 9A:
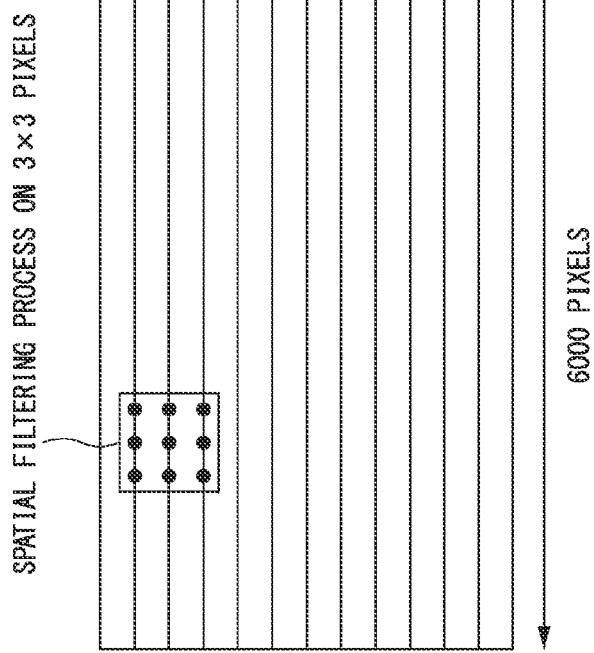
FIG. 9A is a diagram showing a spatial filtering process in a known imaging apparatus and the schematic configuration to execute the spatial filtering process.

The pre-processing section 202 performs various kinds of pre-processing including a spatial filtering process, such as defect correction, shading correction, and pixel defect correction, on the image data input from the selection section 201, and outputs image data obtained as a result of the processing (hereinafter, referred to as "pre-processed image data") to the first data transmission section 203. The pre-processing section 202 is configured to include a plurality of line memories each of which stores image data, which corresponds to one row in the horizontal direction (lateral direction, first direction) of the image, of the image data input from the selection section 201, as shown in FIG. 9B. The configuration of the pre-processing section 202 is the same as the configuration of a pre-processing section provided in an imaging apparatus in the related art. The pre-processing operation of the pre-processing section 202 is also the same as the operation of the pre-processing section provided in the imaging apparatus in the related art. Therefore, detailed explanation regarding the configuration of the pre-processing section 202 or the pre-processing operation of the pre-processing section 202 will be omitted.

The first data transmission section 203 stores (writes) the pre-processed image data input from the pre-processing section 202 in the DRAM 601 connected to the DRAM controller 600 by the DMA, for example. Since the configuration of the first data transmission section 203 or the operation when storing (writing) the pre-processed image data in the DRAM 601 by the DMA is the same as the normal configuration or operation to store data by the DMA, detailed explanation thereof will be omitted. The method used when the first data transmission section 203 stores (writes) the pre-processed image data in the DRAM 601 may be a method other than the DMA.

The second data transmission section 204 stores (writes) the image data input from the selection section 201, that is, image data that has not been pre-processed by the pre-processing section 202 (hereinafter, referred to as "original image data") in the DRAM 601 connected to the DRAM controller 600 by the DMA, for example. Similar to the first data transmission section 203, the configuration of the second data transmission section 204 or the operation when storing (writing) the original image data in the DRAM 601 by the DMA is the same as the normal configuration or operation to store data by the DMA. Accordingly, detailed explanation thereof will be omitted. Similar to the first data transmission section 203, the method used when the second data transmission section 204 stores (writes) the original image data in the DRAM 601 may be a method other than the DMA.

The data acquisition section 205 acquires (reads) the image data stored in the DRAM 601 through the DRAM controller 600 by the DMA, for example, and outputs the acquired image data to the selection section 201. The image data acquired by the data acquisition section 205 may not only be the pre-processed image data stored by the first data transmission section 203 or the original image data stored by the second data transmission section 204 but also image data stored in the DRAM 601 after image processing by the image-processing unit 300, for example.

The image-processing unit 300 acquires (reads) the pre-processed image data stored in the DRAM 601, and generates image data for display or image data for recording by performing various kinds of image processing, such as noise removal processing, distortion aberration correction, YC conversion processing, resizing process, JPEG compression processing, and video compression processing (for example, MPEG compression processing or H.264 compression processing), on the acquired pre-processed image data. Then, the image-processing unit 300 stores (writes) the generated image data for display or image data for recording in the DRAM 601 again.

In addition, the image-processing unit 300 acquires (reads) the image data for recording stored in the DRAM 601, and generates image data for display by performing various kinds of image processing, such as JPEG decompression processing and video decompression processing (for example, MPEG decompression processing or H.264 decompression processing). Then, the image-processing unit 300 stores (writes) the generated image data for display in the DRAM 601 again.

The display-processing unit 400 acquires (reads) the image data for display stored in the DRAM 601, and performs display processing, such as a process of superimposing data for on-screen display (OSD) on the acquired image data for display. Then, the image data after display processing is output to the display device 401.

The display device 401 is a display device, such as a thin film transistor (TFT) liquid crystal display (LCD) or an organic electroluminescence (EL) display, and displays an image corresponding to the image data after display processing that is output from the display-processing unit 400.

The display device 401 may be a display device, such as an electronic view finder (EVF), or an external display, such as a television. Although the display device 401 is also a component of the imaging apparatus 10 in FIG. 1, the display device 401 may be configured to be detachable from the imaging apparatus 10.

The card IF unit 500 acquires (reads) the image data for recording that is recorded in the DRAM 601, and records the acquired image data for recording on the recording medium 501. In addition, the card IF unit 500 reads the image data recorded on the recording medium 501, and transmits (writes) the read image data to the DRAM 601.

The recording medium 501 is a recording medium, such as an SD memory card or a compact flash (CF: registered trademark), and records the image data for recording that is output from the card IF unit 500. In addition, the image data recorded by the card IF unit 500 is read. Although the recording medium 501 is also a component of the imaging apparatus 10 in FIG. 1, the recording medium 501 may be configured to be detachable from the imaging apparatus 10.

The DRAM controller 600 controls the storage (writing) of data into the connected DRAM 601 and the acquisition (reading) of data from the DRAM 601 in response to an access request to the DRAM 601 from a plurality of components in the imaging apparatus 10 connected to the data bus 800, for example, in response to the access request of DMA.

The DRAM 601 is a memory (storage unit) whose access control is performed by the DRAM controller 600. The DRAM 601 temporarily stores (memorizes) various kinds of data in the process of each component of the imaging apparatus 10.

The CPU 700 controls the components of the imaging apparatus 10, that is, the entire imaging apparatus 10.

For example, the CPU 700 controls the operation of each component in the imaging apparatus 10 according to an imaging operation or a reproduction operation in the imaging apparatus 10. For example, the CPU 700 controls the start of the output of the image data from the image sensor 100 or the start of the acquisition of the image data by the image-capturing processing unit 200 when the imaging apparatus 10 performs an imaging operation.

In addition, the CPU 700 controls the selection of the output destination of image data by the selection section 201 of the image-capturing processing unit 200, or performs a setting of transmission of image data by the first and second data transmission sections 203 and 204 and a setting of the data acquisition section 205.

With such a configuration, in the imaging apparatus 10 of the first embodiment, it is possible to acquire the image data output from the image sensor 100 in real time while performing various kinds of pre-processing including a spatial filtering process directly on the acquired image data. In addition, in the imaging apparatus 10 of the first embodiment, various kinds of pre-processing including a spatial filtering process can be performed on the image data stored in the DRAM 601 by acquiring the image data stored in the DRAM 601 by the data acquisition section 205. That is, in the imaging apparatus 10 of the first embodiment, various kinds of pre-processing including a spatial filtering process can also be performed on image data other than the image data that is input in real time.

Next, an example of the operation when pre-processing (spatial filtering process) on the image data output from the image sensor 100 is performed in the imaging apparatus 10 will be described. In the following explanation, a case will be described in which the number of pixels in the horizontal direction of the image sensor 100 is 10000, that is, the image sensor 100 captures an image having a horizontal width of 10000 pixels and the pre-processing section 202 includes a line memory having a storage capacity of 6000 pixels in the horizontal direction. That is, the following explanation will be given for an operation relevant to how to perform pre-processing on the input image data of one row when the amount of image data in the horizontal direction that the image sensor 100 outputs for each row (hereinafter, referred to as "input image data") is larger than the amount of image data of one row that can be stored in a line memory provided in the pre-processing section 202, and accordingly, all pieces of the input image data of one row cannot be stored in the line memory.

When the amount of input image data is larger than the amount of data that can be stored in a line memory provided in the pre-processing section 202, that is, when the amount of input image data that can be pre-processed by the image-capturing processing unit 200 is smaller than the amount of input image data that the image sensor 100 outputs for each row, the imaging apparatus 10 performs pre-processing on all pieces of the input image data by performing the pre-processing separately on the input image data divided in a range of the amount of data that can be pre-processed (here, 6000 pixels) as described above. In order to facilitate the explanation, the following explanation will be given for a case where input image data, which is input from the image sensor 100, is halved and pre-processing is performed separately on each of the divided halves (that is, twice).

Figure 2:
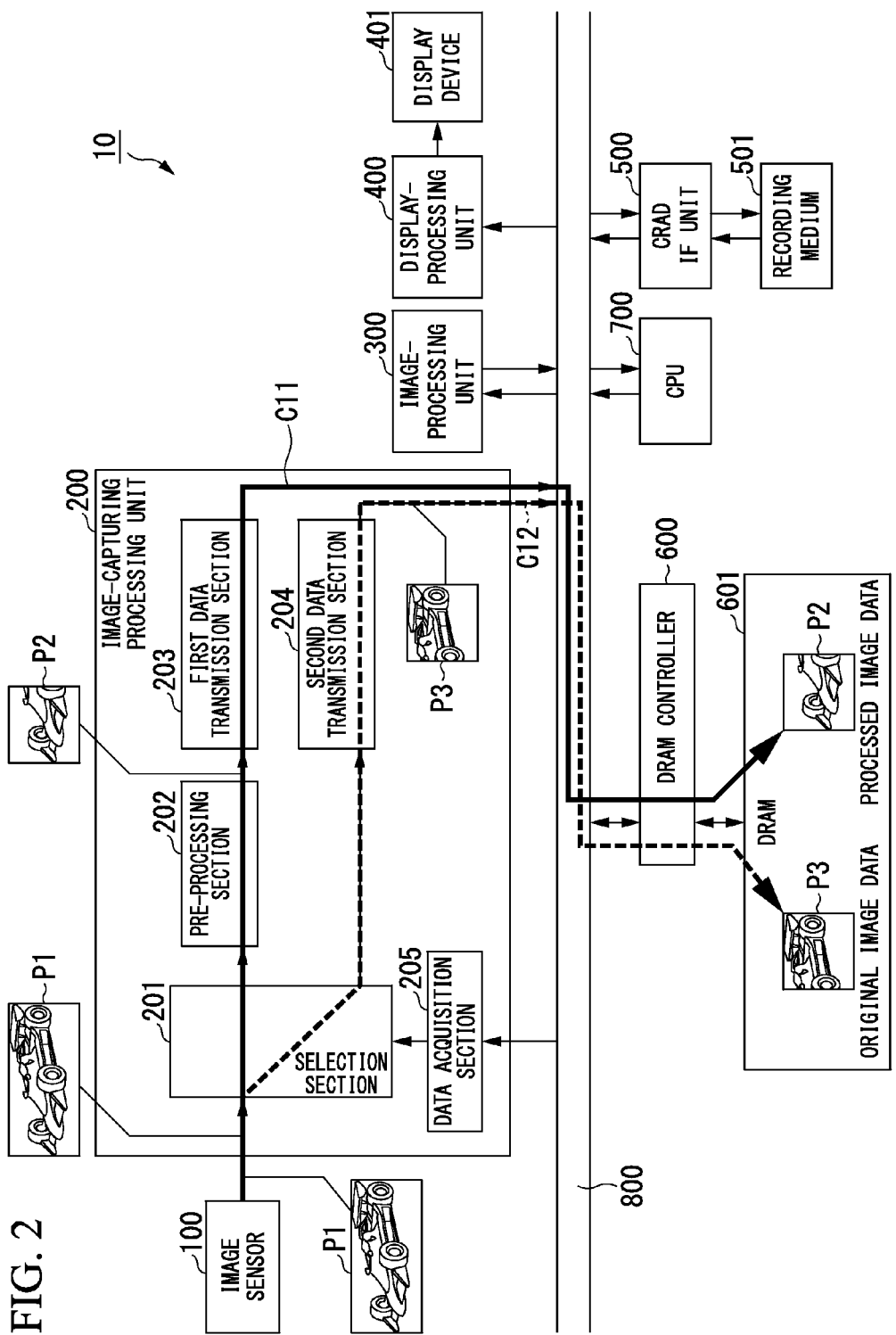
FIG. 2 is a diagram schematically showing an example of the first operation in a spatial filtering process by the imaging apparatus of the first embodiment.
Figure 3:
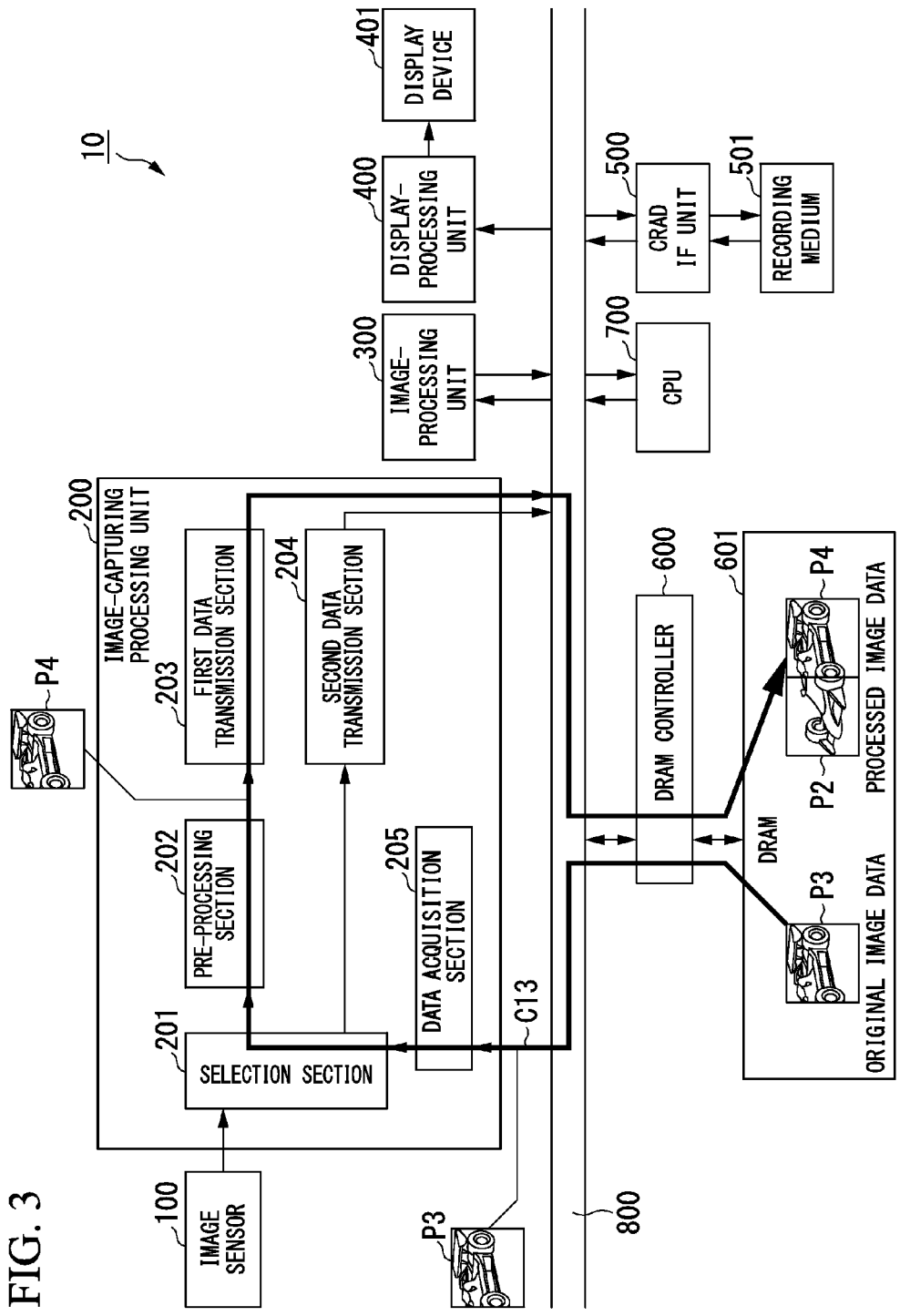
FIG. 3 is a diagram schematically showing an example of the second operation in the spatial filtering process by the imaging apparatus of the first embodiment.

FIGS. 2 and 3 are diagrams schematically showing an example of the pre-processing operation of the imaging apparatus 10 of the first embodiment. FIG. 2 shows an example of the first operation when pre-processing section 202 performs pre-processing (spatial filtering process) on the input image data of one half (left side) that is input from the image sensor 100. FIG. 3 shows an example of the second operation when pre-processing section 202 performs pre-processing (spatial filtering process) on the input image data of the other half (right side) that is input from the image sensor 100.

<First Operation>

In the first operation (operation of the first pass), pre-processed image data obtained by performing pre-processing in real time on input image data, which is output from the image sensor 100, is transmitted (written) to the DRAM 601, and input image data that cannot be pre-processed is transmitted (written) to the DRAM 601 as it is. FIG. 2 shows the path of each piece of data in the first operation (operation of the first pass) on the block diagram of the imaging apparatus 10 shown in FIG. 1.

First, in the operation of the first pass, in the path of image data of a path C11 shown in FIG. 2, pre-processed image data obtained by performing pre-processing on the input image data in real time is transmitted (written) to the DRAM 601. More specifically, in the operation of the first pass, the image sensor 100 captures an image P1 having a horizontal width of 10000 pixels, and outputs the input image data of the captured image P1 to the image-capturing processing unit 200. In the image-capturing processing unit 200, input image data in all regions of the image P1 input from the image sensor 100 is acquired, and the acquired input image data of the image P1 is sequentially input to the selection section 201 of the image-capturing processing unit 200. Then, the selection section 201 outputs the input image data in all regions of the input image P1 sequentially to both the pre-processing section 202 and the second data transmission section 204.

The pre-processing section 202 performs pre-processing on input image data of an image P2, which is a region of the left half, of the input image data of the image P1 that is sequentially input from the selection section 201, and sequentially outputs pre-processed image data of the image P2 after pre-processing to the first data transmission section 203. Then, the first data transmission section 203 transmits (writes) the pre-processed image data of the image P2, which is sequentially input from the pre-processing section 202, to the DRAM 601 through the DRAM controller 600. As a result, the pre-processed image data of the image P2 after pre-processing is stored in the DRAM 601.

In addition, in the operation of the first pass, in the path of image data of a path C12 shown in FIG. 2, input image data is transmitted (written) to the DRAM 601 as it is. More specifically, in the operation of the first pass, the second data transmission section 204 transmits (writes) input image data of an image P3 that is a region of the right half, of the input image data of the image P1 that is sequentially input from the selection section 201, to the DRAM 601 through the DRAM controller 600 as it is as original image data of the image P3. As a result, the input image data of the image P3 of the right half of the image P1 output from the image sensor 100 is stored in the DRAM 601 as it is.

Thus, in the operation of the first pass, pre-processed image data of the image P2 obtained by performing pre-processing on the region of the left half of the image P1 output from the image sensor 100 and the original image data of the image P3, which is a region of the right half of the image P1 output from the image sensor 100, are stored in the DRAM 601.

In the operation of the first pass, when storing the original image data in the DRAM 601, input image data in all regions of the image P1 that is input from the image sensor 100 can also be stored in the DRAM 601 as original image data of the image P1. However, as described above, in the operation of the first pass, only the input image data of the image P3 of the right half of the image P1 is stored in the DRAM 601 as original image data. This is because pre-processing in a subsequent second operation (operation of the second pass) is performed on only the input image data of the image P3, which is a region of the right half of the image P1 that could not be pre-processed in the operation of the first pass. Therefore, it is possible to reduce the storage capacity of the DRAM 601 and to avoid having to compress the bus band of the data bus 800 than necessary.

<Second Operation>

Then, the imaging apparatus 10 transmits (writes) to the DRAM 601 pre-processed image data obtained by performing pre-processing on the original image data of the image P3 that is the input image data of the right half of the image P1 input from the image sensor 100, which could not be pre-processed in the first operation (operation of the first pass). FIG. 3 shows the path of data in the second operation (operation of the second pass) on the block diagram of the imaging apparatus 10 shown in FIG. 1.

In the operation of the second pass, in the path of image data of a path C13 shown in FIG. 3, pre-processed image data obtained by performing pre-processing on the original image data of the image P3 stored in the DRAM 601 is transmitted (written) to the DRAM 601. More specifically, in the operation of the second pass, the data acquisition section 205 sequentially acquires (reads) the original image data of the image P3 stored in the DRAM 601, and sequentially outputs the acquired original image data of the image P3 to the selection section 201. Then, the selection section 201 sequentially outputs the input original image data of the image P3 to the pre-processing section 202.

The pre-processing section 202 performs pre-processing on the original image data of the image P3 that is sequentially input from the selection section 201, and sequentially outputs pre-processed image data of an image P4 after pre-processing to the first data transmission section 203. Then, the first data transmission section 203 transmits (writes) the pre-processed image data of the image P4, which is sequentially input from the pre-processing section 202, to the DRAM 601 through the DRAM controller 600. As a result, the pre-processed image data of the image P4 after pre-processing is stored in the DRAM 601.

Thus, in the operation of the second pass, pre-processed image data of the image P4 obtained by performing pre-processing on the image P3 of the right half of the image P1 output from the image sensor 100, which is stored in the DRAM 601, is stored in the DRAM 601. In this manner, pre-processed image data (pre-processed image data of the images P2 and P4) obtained by performing pre-processing on the input image data in all regions of one image P1 having a horizontal width of 10000 pixels, which is captured by the image sensor 100, is stored in the DRAM 601.

As described above, in the imaging apparatus 10 of the first embodiment, even when the amount of input image data in the horizontal direction that the image sensor 100 outputs for each row is larger than the amount of image data of one row that can be stored in a line memory provided in the pre-processing section 202 of the image-capturing processing unit 200, pre-processing on all pieces of the input image data of one row can be performed by two operations of the first and second operations. More specifically, in the first operation (operation of the first pass), the imaging apparatus 10 transmits (writes) pre-processed image data, which is obtained by performing pre-processing in real time on the input image data of the left half of the image P1 input from the image sensor 100, and also transmits (writes) the input image data of the right half, which could not be pre-processed, to the DRAM 601 as it is. Then, in the second operation (operation of the second pass), the imaging apparatus 10 performs pre-processing on all pieces of the input image data of one image P1 by transmitting (writing) to the DRAM 601 pre-processed image data obtained by performing pre-processing on the input image data of the right half of the image P1 input from the image sensor 100, which could not be pre-processed in the first operation (operation of the first pass).

Thus, in the imaging apparatus 10 of the first embodiment, even when the amount of image data of one row that can be stored in a line memory provided in the pre-processing section 202 of the image-capturing processing unit 200 is smaller than the amount of image data that the image sensor 100 outputs for each row, it is possible to perform pre-processing on all pieces of image data output from the image sensor 100. That is, it is possible to perform pre-processing corresponding to the image sensor 100 in which the number of pixels has increased, without increasing the circuit size of the imaging apparatus 10, especially, the storage capacity of the line memory. In other words, it is possible to meet an increase in the number of pixels of the image sensor with a small circuit size.

In the example of the pre-processing operation of the imaging apparatus 10 of the first embodiment shown in FIGS. 2 and 3, a case has been described in which the input image data that is input from the image sensor 100 is halved and pre-processing is performed on each of the divided halves (that is, twice). In the actual spatial filtering process, however, it is thought that an incongruous image is obtained in a boundary where the process is divided if an image is divided in one place to perform the process. For this reason, when performing a spatial filtering process multiple times, a region where image data used in each process overlap, that is, an overlapping region is generally provided. In the pre-processing of the imaging apparatus 10 of the first embodiment, it is possible to perform the processing similarly by providing the overlapping region.

Figure 4:
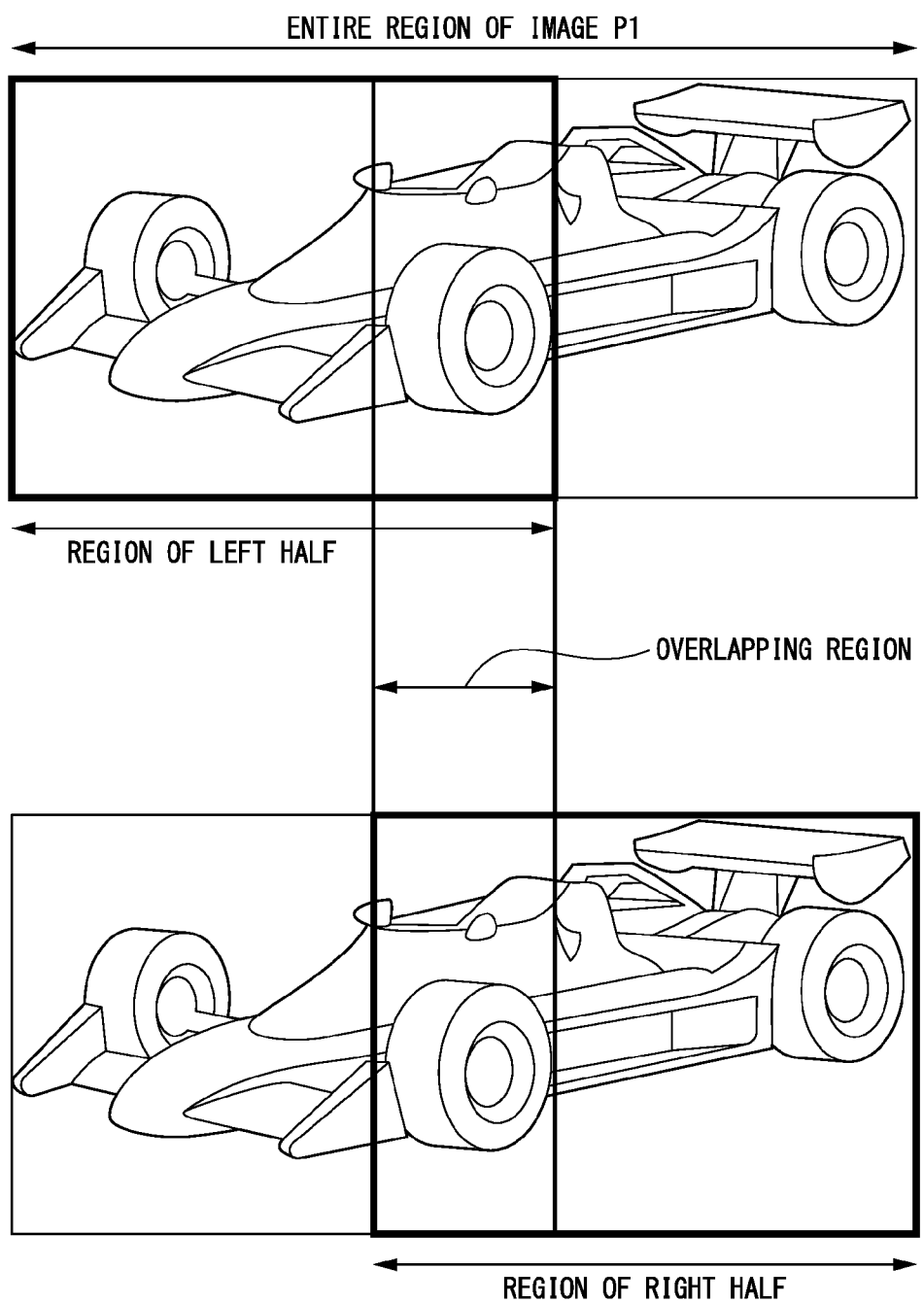
FIG. 4 is a diagram illustrating an example of an image on which a spatial filtering process is performed by the imaging apparatus of the first embodiment.

FIG. 4 is a diagram illustrating an example of an image on which a spatial filtering process is performed by the imaging apparatus 10 of the first embodiment. FIG. 4 shows an example of the case where an overlapping region is provided in a region of the left half, which is processed in the first operation (operation of the first pass), and a region of the right half, which is processed in the second operation (operation of the second pass), at a position where the entire region of the image P1 is divided, when dividing the input image data of the entire region of the image P1 input from the image sensor 100 in the pre-processing operation of the imaging apparatus 10 shown in FIGS. 2 and 3. Thus, by providing an overlapping region when performing the spatial filtering process multiple times, it is possible to eliminate the inconvenience of having the image in a boundary where the process is divided.

In the example of the operation of the pre-processing by the imaging apparatus 10 of the first embodiment shown in FIGS. 2 and 3, a case has been described in which pre-processing on the input image data of the region of the left half of the image P1 input from the image sensor 100 is performed in the first operation (operation of the first pass), and pre-processing on the input image data of the region (image P3) of the right half of the image P1 input from the image sensor 100 is performed in the second operation (operation of the second pass). However, the order of regions of the image to be pre-processed in the first operation (operation of the first pass) and the second operation (operation of the second pass) is not limited to that shown in FIGS. 2 and 3. For example, pre-processing on the input image data of the region of the right half of the image P1 may be performed in the first operation (operation of the first pass), and pre-processing on the input image data of the region of the left half of the image P1 may be performed in the second operation (operation of the second pass).

In the example of the operation of the pre-processing by the imaging apparatus 10 of the first embodiment shown in FIGS. 2 and 3, the case has been described in which the input image data that is input from the image sensor 100 is halved and pre-processing is performed on each of the divided halves (that is, twice). However, the number of division times of pre-processing (spatial filtering process) performed on the input image data of one image is not limited to twice as described above, and may be 3 times or more. An operation when the number of division times of pre-processing (spatial filtering process) is different can be considered in the same manner as the operation when the pre-processing (spatial filtering process) is performed twice (operation of the pre-processing by the imaging apparatus 10 of the first embodiment shown in FIGS. 2 and 3). Accordingly, detailed explanation thereof will be omitted.

The operation of the pre-processing in the imaging apparatus 10 of the first embodiment does not necessarily need to be performed twice or more. For example, when the number of pixels in the horizontal direction of the image sensor mounted in the imaging apparatus is smaller than the storage capacity (6000 pixels in the first embodiment) of the line memory provided in the pre-processing section 202 of the image-capturing processing unit 200, that is, when the amount of input image data is smaller than the amount of data that can be pre-processed by the pre-processing section 202, the pre-processing section 202 can perform pre-processing only once. Accordingly, the pre-processing does not necessarily need to be performed twice or more. Thus, the number of times by which the pre-processing section 202 performs pre-processing can be changed according to the number of pixels in the horizontal direction of the image sensor mounted in the imaging apparatus.

In general, an image sensor can be driven in a plurality of driving modes, such as a driving mode in which all pixel signals are output (hereinafter, referred to as an "all pixel output mode") and a driving mode in which pixel signals are added and output (hereinafter, referred to as a "pixel addition mode"). The all pixel output mode is set when capturing a high-resolution image, such as a still image, and the pixel addition mode is set when performing video imaging or imaging of a so-called live view function of displaying a video for checking a subject to be imaged on a display device. Therefore, for example, when the image sensor 100 is driven in the pixel addition mode and an image having 5000 pixels, which is ½ of the original horizontal width, is output due to the addition of pixel signals in the horizontal direction, the amount of image data that the image sensor 100 outputs for one row is smaller than the amount of image data (6000 pixels) of one row that can be stored in the line memory provided in the pre-processing section 202 of the image-capturing processing unit 200. Also in this case, the pre-processing section 202 can perform pre-processing only once. Therefore, the pre-processing does not necessarily need to be performed twice or more. Thus, based on the driving mode of the image sensor mounted in the imaging apparatus, pre-processing is performed twice when the image sensor is driven in the all pixel output mode, that is, in the mode in which a still image is captured, and pre-processing is performed once in real time when the image sensor is driven in the pixel addition mode, that is, in the mode in which video imaging or live view imaging is performed, for example. Therefore, the number of times by which the pre-processing section 202 performs pre-processing can be changed according to an image to be captured.

In the first embodiment, the case has been described in which the image sensor 100 outputs a pixel signal, which is obtained by performing a raster scan in the horizontal direction of the image, as image data. However, for example, when the image sensor outputs a pixel signal, which is obtained by performing a raster scan in a vertical direction of the image, as image data, the concept of the present invention can be similarly applied by regarding the horizontal direction in the first embodiment as a vertical direction, that is, by regarding the horizontal direction and the vertical direction of the image reversely. In the first embodiment, the case has been described in which pre-processing is performed multiple times by horizontally dividing the image input from the image sensor 100. However, even if pre-processing is performed multiple times by vertically dividing the image input from the image sensor 100, the concept of the present invention can be similarly applied by regarding the horizontal direction and the vertical direction of the image reversely.

In the imaging apparatus, the image-capturing processing unit may perform various processes other than the pre-processing. For example, a conversion section that generates a converted image by converting a normal image may be provided in addition to the configuration to record a normal image, which has the number of pixels that is almost the same as the number of effective pixels of the image sensor, as a still image. For example, it is possible to provide a resizing section that generates a reduced image having the same angle of view as a converted image with the number of pixels smaller than the normal number of pixels. For example, the reduced image generated by the resizing section (hereinafter, referred to as a "reduced image") may be displayed on a display device so that the captured image can be immediately checked, or may be used as an image recorded together with a normal still image (so-called thumbnail) or an image for list display of captured images. That is, various applications can be considered.

Second Embodiment

Next, an imaging apparatus of a second embodiment will be described. In the imaging apparatus of the second embodiment, only the image-capturing processing unit 200 provided in the imaging apparatus 10 of the first embodiment shown in FIG. 1 is different. Therefore, in the explanation of the imaging apparatus of the second embodiment, the same reference numerals are given to the same components as in the imaging apparatus 10 of the first embodiment. In addition, only components and operations different from those in the imaging apparatus 10 of the first embodiment will be described, and detailed explanation regarding the same components and operations as in the imaging apparatus 10 of the first embodiment will be omitted.

Figure 5:
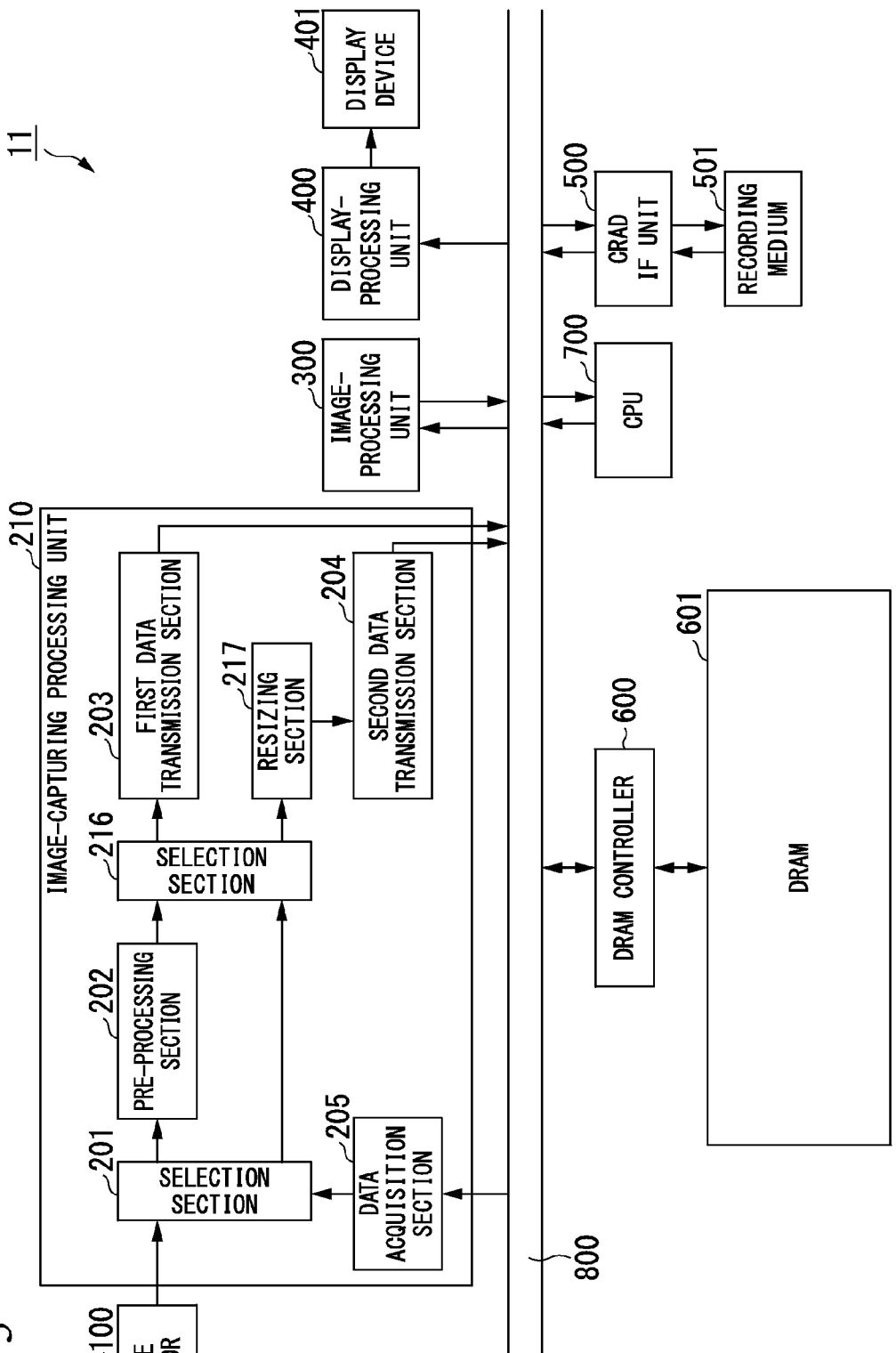
FIG. 5 is a block diagram showing the schematic configuration of an imaging apparatus according to a second embodiment of the present invention.

FIG. 5 is a block diagram showing the schematic configuration of the imaging apparatus according to the second embodiment. An imaging apparatus 11 shown in FIG. 5 includes an image sensor 100, an image-capturing processing unit 210, an image-processing unit 300, a display-processing unit 400, a display device 401, a card IF unit 500, a recording medium 501, a DRAM controller 600, a DRAM 601, and a CPU 700. The image-capturing processing unit 210 of the imaging apparatus 11 includes a selection section 201, a pre-processing section 202, a selection section 216, a first data transmission section 203, a resizing section 217, a second data transmission section 204, and a data acquisition section 205.

The image-capturing processing unit 210, the image-processing unit 300, the display-processing unit 400, the card IF unit 500, the DRAM controller 600, and the CPU 700 in the imaging apparatus 11 are connected to each other through a data bus 800, in the same manner as in the imaging apparatus 10 of the first embodiment shown in FIG. 1. For example, reading of data from the DRAM 601 connected to the DRAM controller 600 and writing of data into the DRAM 601 are performed by the DMA.

The image sensor 100 performs a raster scan of pixels provided in the image sensor 100 itself, and sequentially outputs pixel signals corresponding to subject light to the image-capturing processing unit 210, as image data, in a horizontal direction of the image.

Similar to the image-capturing processing unit 200 provided in the imaging apparatus 10 of the first embodiment, the image-capturing processing unit 210 acquires input image data that is input from the image sensor 100, and transmits (writes) pre-processed image data, which is obtained by performing pre-processing including a spatial filtering process on the acquired input image data, and input image data, which cannot be pre-processed, to the DRAM 601 through the DRAM controller 600.

Also in the image-capturing processing unit 210, similar to the image-capturing processing unit 200 in the first embodiment, the amount of image data that can be pre-processed by the image-capturing processing unit 210, that is, the amount of data in a horizontal direction of the image is smaller than the amount of input image data that the image sensor 100 outputs as the amount of data of one row. Therefore, when input image data having an amount in the horizontal direction that cannot be pre-processed is input, the image-capturing processing unit 210 also performs pre-processing on all pieces of the input image data by performing the pre-processing separately on the input image data divided in a range of the amount of data that can be pre-processed, in the same manner as in the image-capturing processing unit 200 in the first embodiment.

In addition, the image-capturing processing unit 210 generates a reduced image by performing a reduction process, such as a resizing process or a cutting process, based on the pre-processed image data, and transmits (writes) the generated reduced image to the DRAM 601 through the DRAM controller 600. In the following explanation, the image-capturing processing unit 210 functions as a processing unit that generates a reduced image by performing a resizing process.

The selection section 201 selects one or both of the pre-processing section 202 and the selection section 216 as an output destination of the input image data, which is input from the image sensor 100, and the image data input from the data acquisition section 205, and outputs the input image data to the selected output destination.

The pre-processing section 202 outputs pre-processed image data, which is obtained by performing various kinds of pre-processing including a spatial filtering process on the image data input from the selection section 201, to the selection section 216.

The selection section 216 selects a component of the output destination of the input image data. More specifically, the selection section 216 performs conversion processing for converting the pre-processed image data input from the pre-processing section 202, and outputs converted image data. The selection section 216 outputs the image data input from the selection section 201. In this case, the selection section 216 selects at least one of the first data transmission section 203 and the resizing section 217. Then, the selection section 216 outputs the input image data to the selected output destination.

The first data transmission section 203 stores (writes) the image data input from the selection section 216 in the DRAM 601 connected to the DRAM controller 600 by the DMA, for example.

The resizing section 217 performs a resizing process on the image data input from the selection section 216, and outputs image data of a reduced image (hereinafter, referred to as "reduced image data"), which is obtained as a result of resizing (here, reducing) the pre-processed image in a horizontal direction (lateral direction, first direction) and a vertical direction (longitudinal direction, second direction), to the second data transmission section 204. The resizing section 217 can also output the image data (pre-processed image data, input image data, or original image data), which is input from the selection section 216, to the second data transmission section 204 as it is without performing a resizing process.

That is, the resizing section 217 can turn off the function of the resizing process.

The second data transmission section 204 stores (writes) the image data input from the resizing section 217, that is, reduced image data or image data input to the resizing section 217 in the DRAM 601 connected to the DRAM controller 600 by the DMA, for example.

When the reduced image data is stored in the DRAM 601, the image-processing unit 300 performs image processing on both the pre-processed image data and the reduced image data. For example, when the reduced image data is a thumbnail, the thumbnail is associated when performing a JPEG compression process.

The CPU 700 controls the components of the imaging apparatus 11, that is, the entire imaging apparatus 11. For example, the CPU 700 controls the operation of each component in the imaging apparatus 11 according to an imaging operation or a reproduction operation in the imaging apparatus 11. For example, the CPU 700 controls the start of the output of the image data from the image sensor 100 or the start of the acquisition of the image data by the image-capturing processing unit 210 when the imaging apparatus 11 performs an imaging operation.

In addition, the CPU 700 controls the operation of each component in the image-capturing processing unit 210 in each operation after the start of the acquisition of the image data by the image-capturing processing unit 210. For example, the CPU 700 controls the selection of the output destination of image data by the selection sections 201 and 216 of the image-capturing processing unit 210, or performs a setting of the resizing process by the resizing section 217, a setting of the transmission of image data by the first and second data transmission sections 203 and 204, or a setting of the data acquisition section 205.

With such a configuration, also in the imaging apparatus 11 of the second embodiment, similar to the imaging apparatus 10 of the first embodiment, it is possible to perform various kinds of pre-processing including a direct spatial filtering process on image data input in real time and various kinds of pre-processing including a spatial filtering process on the image data stored in the DRAM 601. In the imaging apparatus 11 of the second embodiment, it is possible to generate a reduced image by performing a resizing process on the pre-processed image data in addition to various kinds of pre-processing including a spatial filtering process.

Next, an example of the operation when pre-processing (spatial filtering process) on the image data output from the image sensor 100 is performed and the operation of generating a reduced image in the imaging apparatus 11 will be described. In the following explanation, similar to the imaging apparatus 10 of the first embodiment, the number of pixels in the horizontal direction of the image sensor 100 is 10000, and the pre-processing section 202 includes a line memory having a storage capacity of 6000 pixels in the horizontal direction. That is, the following explanation will be given for an operation relevant to how to perform pre-processing on the input image data of one row or how to generate a reduced image when the amount of input image data in the horizontal direction that the image sensor 100 outputs for each row is larger than the amount of image data of one row that can be stored in a line memory provided in the pre-processing section 202, and accordingly, all pieces of the input image data of one row cannot be stored in the line memory.

As in the imaging apparatus 10 of the first embodiment, in order to facilitate the explanation, the following explanation will be given for a case where input image data, which is input from the image sensor 100, is halved and pre-processing is performed separately on each of the divided halves (that is, twice).

Figure 6:
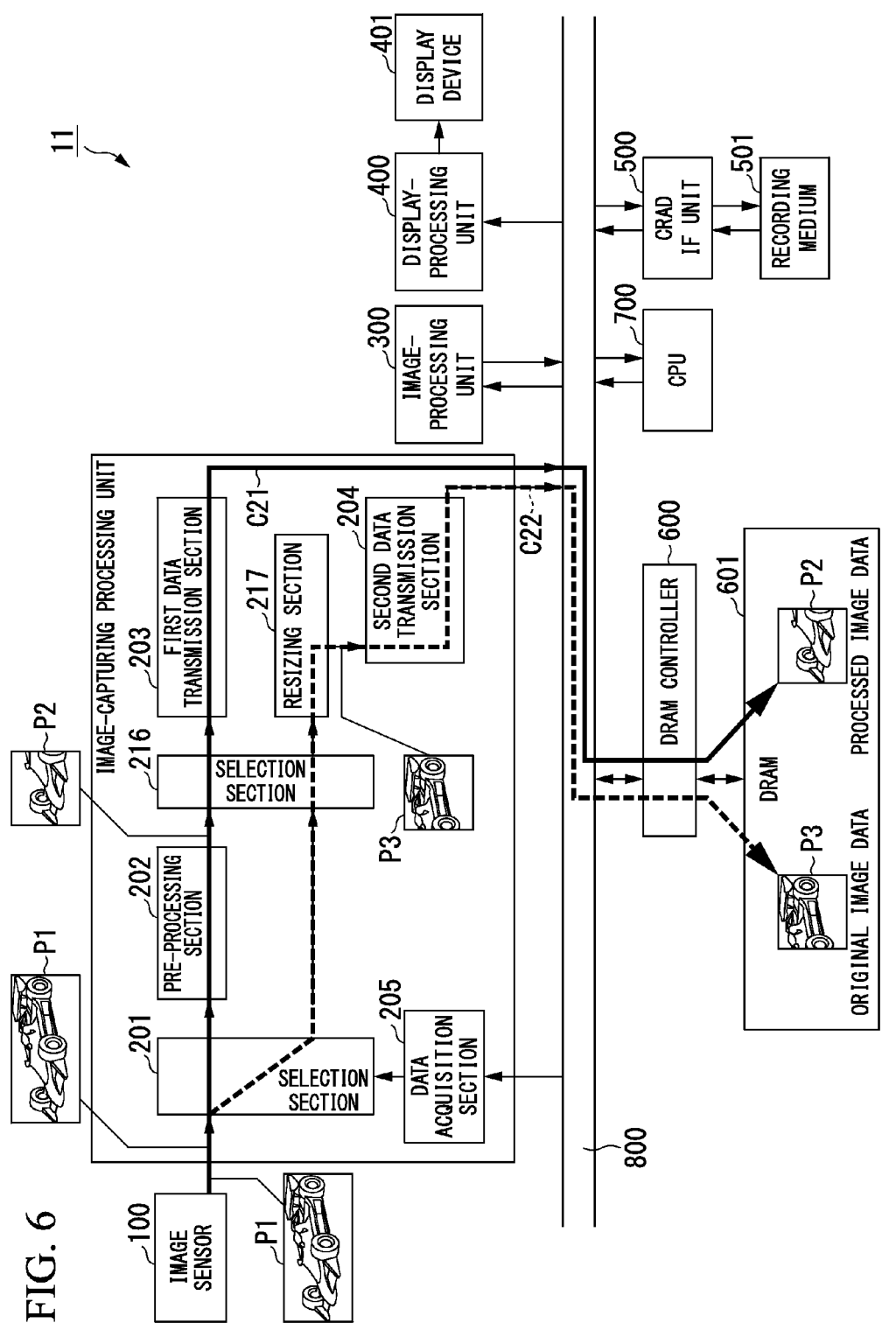
Figure 7:
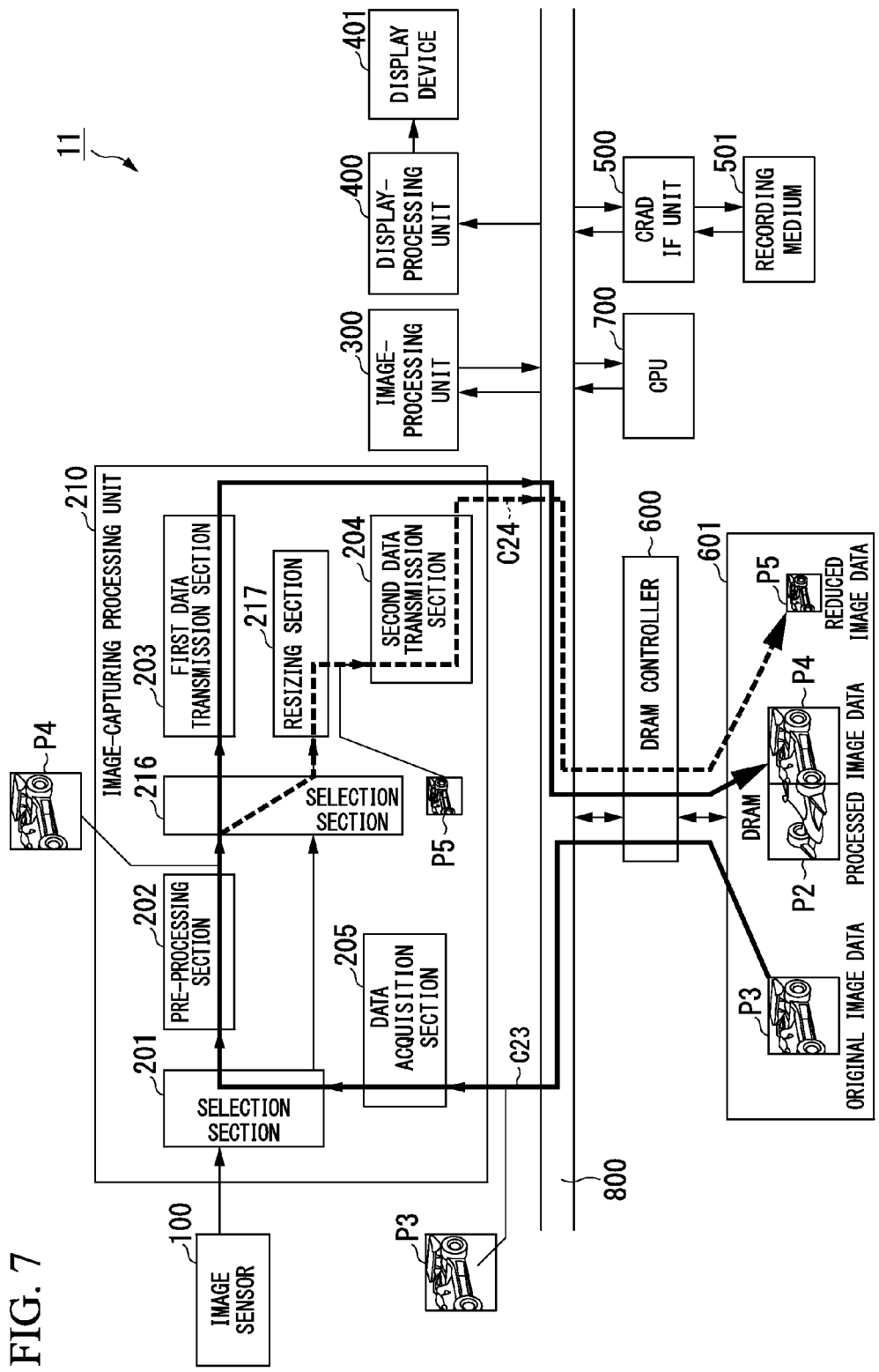
FIG. 7 is a diagram schematically showing an example of the second operation in the spatial filtering process by the imaging apparatus of the second embodiment.
Figure 8:
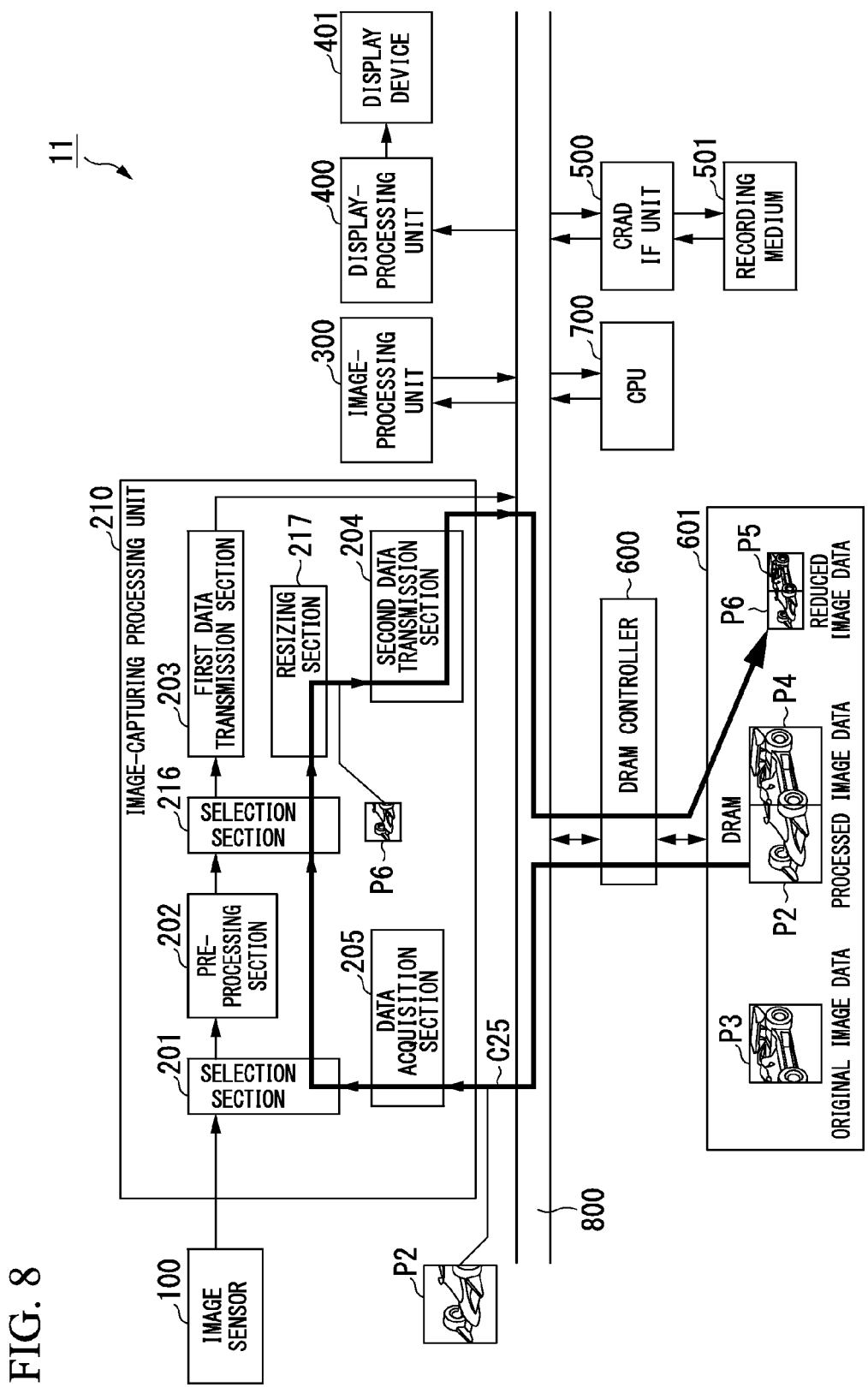
FIG. 8 is a diagram schematically showing an example of the third operation in the spatial filtering process by the imaging apparatus of the second embodiment.

FIGS. 6 to 8 are diagrams schematically showing an example of the operation of pre-processing and reduced image generation by the imaging apparatus 11 of the second embodiment. FIG. 6 shows an example of the first operation when the imaging apparatus 11 performs pre-processing (spatial filtering process) on the input image data of one half (left side) that is input from the image sensor 100. FIG. 7 shows an example of the second operation when the imaging apparatus 11 performs pre-processing (spatial filtering process) on the input image data of the other half (right side) that is input from the image sensor 100 while generating a reduced image corresponding to the pre-processed image data of the other half (right side). FIG. 8 shows an example of the third operation when the imaging apparatus 11 generates a reduced image corresponding to the pre-processed image data of one half (left side).

<First Operation>

In the first operation (operation of the first pass), similar to the imaging apparatus 10 of the first embodiment, pre-processed image data obtained by performing pre-processing in real time on input image data, which is output from the image sensor 100, is transmitted (written) to the DRAM 601, and input image data that cannot be pre-processed is transmitted (written) to the DRAM 601 as it is. FIG. 6 shows the path of each piece of data in the first operation (operation of the first pass) on the block diagram of the imaging apparatus 11 shown in FIG. 5.

First, in the operation of the first pass, in the path of image data of a path C21 shown in FIG. 6, pre-processed image data obtained by performing pre-processing on the input image data in real time is transmitted (written) to the DRAM 601. More specifically, in the operation of the first pass, the image sensor 100 captures an image P1 having a horizontal width of 10000 pixels, and outputs the input image data of the captured image P1 to the image-capturing processing unit 210. In the image-capturing processing unit 210, input image data in all regions of the image P1 input from the image sensor 100 is acquired, and the acquired input image data of the image P1 is sequentially input to the selection section 201 of the image-capturing processing unit 210. Then, the selection section 201 outputs the input image data in all regions of the input image P1 sequentially to both the pre-processing section 202 and the selection section 216.

The pre-processing section 202 performs pre-processing on input image data of the image P2, which is a region of the left half, of the input image data of the image P1 that is sequentially input from the selection section 201, and sequentially outputs the pre-processed image data of the image P2 after pre-processing to the selection section 216. The selection section 216 outputs the pre-processed image data of the image P2, which is input from the pre-processing section 202, to the first data transmission section 203. Then, the first data transmission section 203 transmits (writes) the pre-processed image data of the image P2, which is sequentially input from the selection section 216, to the DRAM 601 through the DRAM controller 600. As a result, the pre-processed image data of the image P2 after pre-processing is stored in the DRAM 601.

In addition, in the operation of the first pass, in the path of image data of a path C22 shown in FIG. 6, input image data is transmitted (written) to the DRAM 601 as it is. More specifically, in the operation of the first pass, the selection section 216 sequentially outputs the input image data of the image P1, which is sequentially input from the selection section 201, to the resizing section 217. In the operation of the first pass, the function of the resizing process in the resizing section 217 is turned off. Then, the resizing section 217 outputs input image data of the image P3, which is a region of the right half, of the input image data of the image P1 that is sequentially input from the selection section 216, to the second data transmission section 204 as it is. Then, the second data transmission section 204 transmits (writes) the input image data of the image P3 input sequentially from the resizing section 217, as it is as original image data of the image P3, to the DRAM 601 through the DRAM controller 600. As a result, the input image data of the image P3 of the right half of the image P1 output from the image sensor 100 is stored in the DRAM 601 as it is.

Thus, in the operation of the first pass, pre-processed image data of the image P2 obtained by performing pre-processing on the region of the left half of the image P1 output from the image sensor 100 and the original image data of the image P3, which is a region of the right half of the image P1 output from the image sensor 100, are stored in the DRAM 601.

<Second Operation>

Then, the imaging apparatus 11 transmits (writes) to the DRAM 601 pre-processed image data obtained by performing pre-processing on the original image data of the image P3 that is the input image data of the right half of the image P1 input from the image sensor 100, which could not be pre-processed in the first operation (operation of the first pass), and transmits (writes) to the DRAM 601 reduced image data obtained by performing a resizing process on the pre-processed image data of the image P3. FIG. 7 shows the path of data in the second operation (operation of the second pass) on the block diagram of the imaging apparatus 11 shown in FIG. 5.

First, in the operation of the second pass, in the path of image data of a path C23 shown in FIG. 7, pre-processed image data obtained by performing pre-processing on the original image data of the image P3 stored in the DRAM 601 is transmitted (written) to the DRAM 601. More specifically, in the operation of the second pass, the data acquisition section 205 sequentially acquires (reads) the original image data of the image P3 stored in the DRAM 601, and sequentially outputs the acquired original image data of the image P3 to the selection section 201. Then, the selection section 201 sequentially outputs the input original image data of the image P3 to the pre-processing section 202.

The pre-processing section 202 performs pre-processing on the original image data of the image P3 input sequentially from the selection section 201, and sequentially outputs the pre-processed image data of the image P4 after pre-processing to the selection section 216. The selection section 216 sequentially outputs the pre-processed image data of the image P4, which is input from the pre-processing section 202, to both the first data transmission section 203 and the resizing section 217. Then, the first data transmission section 203 transmits (writes) the pre-processed image data of the image P4, which is sequentially input from the selection section 216, to the DRAM 601 through the DRAM controller 600. As a result, the pre-processed image data of the image P4 after pre-processing is stored in the DRAM 601.

In the operation of the second pass, in the path of image data of a path C24 shown in FIG. 7, a reduced image is generated by performing a resizing process on the original image data of the image P3 stored in the DRAM 601, and transmits (writes) the reduced image data of the generated reduced image to the DRAM 601. More specifically, in the operation of the second pass, the function of the resizing process in the resizing section 217 is turned on. Then, the resizing section 217 generates a reduced image by performing a resizing process on the pre-processed image data of the image P4 input sequentially from the selection section 216, and outputs the reduced image data of a generated reduced image P5 to the second data transmission section 204. Then, the second data transmission section 204 transmits (writes) the reduced image data of the reduced image P5, which is sequentially input from the resizing section 217, to the DRAM 601 through the DRAM controller 600. As a result, the reduced image data of the reduced image P5 of the right half of the image P1 output from the image sensor 100 is stored in the DRAM 601.

Thus, in the operation of the second pass, pre-processed image data of the image P4 obtained by performing pre-processing on the image P3 of the right half of the image P1 output from the image sensor 100, which is stored in the DRAM 601, and reduced image data of the reduced image P5 obtained by performing a resizing process on the image P4 after pre-processing of the right half of the image P1, which is stored in the DRAM 601, are stored in the DRAM 601. In this manner, pre-processed image data (pre-processed image data of the images P2 and P4) obtained by performing pre-processing on the input image data in all regions of one image P1 having a horizontal width of 10000 pixels, which is captured by the image sensor 100, is stored in the DRAM 601.

<Third Operation>

Then, in order to generate a reduced image corresponding to the input image data of the left half of the image P1 input from the image sensor 100 on which a reduced image has not been generated, the imaging apparatus 11 transmits (writes) reduced image data obtained by performing a resizing process on the pre-processed image data of the image P2, which is pre-processed image data obtained by performing pre-processing on the input image data of the left half of the image P1, to the DRAM 601. FIG. 8 shows the path of data in the third operation (operation of the third pass) on the block diagram of the imaging apparatus 11 shown in FIG. 5.

In the operation of the third pass, in the path of image data of a path C25 shown in FIG. 8, a reduced image is generated by performing a resizing process on the pre-processed image data of the image P2 stored in the DRAM 601, and transmits (writes) the reduced image data of the generated reduced image to the DRAM 601.

More specifically, in the operation of the third pass, the data acquisition section 205 sequentially acquires (reads) the pre-processed image data of the image P2 stored in the DRAM 601, and sequentially outputs the acquired pre-processed image data of the image P2 to the selection section 201. Then, the selection section 201 sequentially outputs the input pre-processed image data of the image P2 to the selection section 216.

The selection section 216 sequentially outputs the pre-processed image data of the image P2, which is sequentially input from the selection section 201, to the resizing section 217. In the operation of the third pass, the function of the resizing process in the resizing section 217 is turned on. Then, the resizing section 217 generates a reduced image by performing a resizing process on the pre-processed image data of the image P2 input sequentially from the selection section 216, and outputs the reduced image data of a generated reduced image P6 to the second data transmission section 204. Then, the second data transmission section 204 transmits (writes) the reduced image data of the reduced image P6, which is sequentially input from the resizing section 217, to the DRAM 601 through the DRAM controller 600. As a result, the reduced image data of the reduced image P6 of the left half of the image P1 output from the image sensor 100 is stored in the DRAM 601.

Thus, in the operation of the third pass, reduced image data of the reduced image P6 obtained by performing a resizing process on the image P2 after pre-processing of the left half of the image P1 output from the image sensor 100, which is stored in the DRAM 601, is stored in the DRAM 601. In this manner, reduced image data (reduced image data of the images P5 and P6) obtained by performing a resizing process after performing pre-processing on the input image data in all regions of one image P1 having a horizontal width of 10000 pixels, which is captured by the image sensor 100, is stored in the DRAM 601.

As described above, also in the imaging apparatus 11 of the second embodiment, similar to the imaging apparatus 10 of the first embodiment, even when the amount of input image data in the horizontal direction that the image sensor 100 outputs for each row is larger than the amount of image data of one row that can be stored in a line memory provided in the pre-processing section 202 of the image-capturing processing unit 210, pre-processing on all pieces of the input image data of one row can be performed by multiple operations. Therefore, also in the imaging apparatus 11 of the second embodiment, it is possible to achieve the same effect as in the imaging apparatus 10 of the first embodiment.

In the imaging apparatus 11 of the second embodiment, a reduced image corresponding to an image after pre-processing can be generated by multiple operations, in addition to the pre-processing on the image input from the image sensor 100. More specifically, in the second operation (operation of the second pass), the imaging apparatus 11 performs pre-processing on the image P3 of the right half of the image P1 input from the image sensor 100, and generates the reduced image P5 by performing a resizing process on the pre-processed image data of the image P3 after pre-processing. Then, in the third operation (operation of the third pass), the imaging apparatus 11 generates the reduced image P6 by performing a resizing process on the pre-processed image data of the image P2 obtained by performing pre-processing on the image of the left half of the image P1 input from the image sensor 100 in the first operation (operation of the first pass).

Thus, in the imaging apparatus 11 of the second embodiment, even if pre-processing on the image data in all regions of one image has not been completed, the next processing (resizing process for reduction in the second embodiment) can be performed from the region of the image on which pre-processing has been completed. Therefore, in the imaging apparatus 11 of the second embodiment, since the waiting time of each process on the image is shortened, an improvement in the processing speed of the entire imaging apparatus can be expected.

In the imaging apparatus 11 of the second embodiment, the case has been described in which an image is reduced by the resizing process. However, the resizing process may be a process of enlarging an image. In addition, in the example of the operation of the imaging apparatus 11 of the second embodiment shown in FIGS. 6 to 8, the case has been described in which not only the pre-processing but also the resizing process is performed on the image. However, the present invention is not limited to only the resizing process. For example, the concept of the present invention can also be similarly applied to a process of changing the angle of view, such as a cutting process, or other various processes.

Also in the imaging apparatus 11 of the second embodiment, the concept of the process of providing the overlapping region, the number of times to execute pre-processing, the execution order of pre-processing when the region of an image is divided, a direction in which the image sensor 100 outputs the input image data, and a direction in which pre-processing according to the image division direction is performed is the same as that in the imaging apparatus 10 of the first embodiment.

As described above, in the embodiment of the present invention, the selection section, the second data transmission section, and the data acquisition section are provided in the image-capturing processing unit provided in the imaging apparatus, as a configuration to perform various kinds of pre-processing including a spatial filtering process on image data output from the image sensor multiple times in a range of the storage capacity of the line memory provided in the image-capturing processing unit. Then, in the embodiment of the present invention, pre-processing is directly performed on image data that is input in real time from the image sensor, and image data on which pre-processing cannot be directly performed is transmitted (written) to a storage unit (DRAM in the present embodiment) as it is by the second data transmission section. Then, in the embodiment of the present invention, image data to be pre-processed is switched to image data stored in the storage unit, which has been acquired (read) by the data acquisition section, and pre-processing is performed. As a result, pre-processing on all pieces of image data of one image input from the image sensor is performed.

Thus, in the embodiment of the present invention, it is possible to perform pre-processing corresponding to the image sensor in which the number of pixels has increased, without increasing the circuit size of the imaging apparatus, especially, the storage capacity of the line memory provided in the image-capturing processing unit. Therefore, in the embodiment of the present invention, it is possible to perform pre-processing corresponding to a multi-pixel image sensor with a smaller circuit size than that corresponding to an image sensor, in which the number of pixels has increased, in a known imaging apparatus. In the embodiment of the present invention, since pre-processing can be performed directly on the image data input from the image sensor, time required for the spatial filtering process can be made shorter than that in the known imaging apparatus.

In the embodiment of the present invention, in addition to various kinds of pre-processing including the spatial filtering process, other various processes (resizing process in the present embodiment) based on the image data after pre-processing are also performed multiple times similar to the pre-processing. Therefore, in the embodiment of the present invention, even if pre-processing on the image data in all regions of one image has not been completed, the next processing can be performed from the region of the image on which pre-processing has been completed. As a result, in the embodiment of the present invention, since the waiting time of each process on the image is shortened, it is possible to increase the processing speed of the entire imaging apparatus.

In the present embodiment, the case has been described in which pre-processing is a process including the spatial filtering process. However, the content of the pre-processing is not limited to the embodiment of the present invention. As long as the relationship between the amount of image data that can be pre-processed and the amount of image data output from the image sensor 100 is the relationship described above, the concept of the present invention can be similarly applied even if the spatial filtering process is not included in the pre-processing.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

What is claimed is:

1. An imaging apparatus, comprising:
a solid-state imaging device which has a plurality of pixels and outputs a pixel signal corresponding to a formed image of a subject as an image data;
an image-capturing processing unit which outputs a pre-processed image data that is obtained by performing pre-processing on a part of the image data input from the solid-state imaging device, and an un-processed image data except the part of the image data from the image data input from the solid-state imaging device; and
a storage unit which stores the pre-processed image data and the un-processed image data,
wherein the image-capturing processing unit includes:
a pre-processing section which has a line memory, which stores the image data of which amount is smaller than a data amount of the image data in a first direction of the image, and outputs the pre-processed image data obtained by performing pre-processing on the image data of the image divided within a range of the data amount of the image data that is capable of being stored in the line memory;
a first data transmission section which transmits the pre-processed image data to the storage unit;
a second data transmission section which transmits the image data in the first direction of the image that has not been pre-processed by the pre-processing section, to the storage unit as the un-processed image data;
a data acquisition section which acquires image data stored in the storage unit; and
a selection section which outputs the image data input from the solid-state imaging device or the image data acquired by the data acquisition section to at least one of the pre-processing section and the second data transmission section,
wherein, in a first operation, the first data transmission section transmits first pre-processed image data, which is obtained after the pre-processing section performs pre-processing on the image data of a first image obtained by dividing the image within a range of the data amount of the image data that is capable of being stored in the line memory, to the storage unit, and the second data transmission section transmits the image data of a second image obtained by dividing the image that has not been pre-processed by the pre-processing section, as first un-processing image data, to the storage unit, and
in a second operation after the first operation is completed, the data acquisition section acquires the first un-processing image data, stored in the storage unit, the selection section outputs the first un-processing image data, to the pre-processing section, and the first data transmission section transmits second pre-processed image data, which is obtained after the pre-processing section performs pre-processing on the first un-processing image data, to the storage unit.

2. The imaging apparatus according to claim 1,
wherein the image-capturing processing unit further includes a conversion section that performs conversion processing for converting the pre-processed image data and outputs converted image data after the conversion processing.

3. The imaging apparatus according to claim 2,
wherein the conversion section includes a resizing section that resizes an image corresponding to the pre-processed image data to an image, which has a size set in advance in the first direction and a second direction perpendicular to the first direction, and outputs the converted image data of the resized image.

4. The imaging apparatus according to claim 3,
wherein, in the second operation, the first data transmission section transmits second pre-processed image data, which is obtained after the pre-processing section performs pre-processing on the first un-processing image data, to the storage unit, and the second data transmission section transmits first converted image data, which is obtained after the resizing section performs a resizing process on the second pre-processed image data, to the storage unit, and in a third operation after the second operation is completed, the data acquisition section acquires the first pre-processed image data stored in the storage unit, the selection section outputs the first pre-processed image data to the resizing section, and the second data transmission section transmits second converted image data, which is obtained after the resizing section performs a resizing process on the first pre-processed image data, to the storage unit.

* * * * *